United States Patent
Sotoodeh et al.

(10) Patent No.: US 7,320,075 B2
(45) Date of Patent: Jan. 15, 2008

(54) SOFTWARE PROTECTION METHOD UTILIZING HIDDEN APPLICATION CODE IN A PROTECTION DYNAMIC LINK LIBRARY OBJECT

(75) Inventors: Mehdi Sotoodeh, Mission Viejo, CA (US); Brian Douglas Grove, Laguna Niguel, CA (US); Laszlo Elteto, Irvine, CA (US)

(73) Assignee: SafeNet, Inc., Belcamp, MD (US)

( * ) Notice: Subject to any disclaimer, the term of this patent is extended or adjusted under 35 U.S.C. 154(b) by 757 days.

(21) Appl. No.: 10/298,701

(22) Filed: Nov. 18, 2002

(65) Prior Publication Data

US 2003/0097577 A1    May 22, 2003

Related U.S. Application Data (60) Provisional application No. 60/331,855, filed on Nov. 20, 2001.

(51) Int. Cl.
*G06F 12/14* (2006.01)
*H04L 9/00* (2006.01)

(52) U.S. Cl. ........................ 713/191; 713/171
(58) Field of Classification Search ........ 713/189–193, 713/171
See application file for complete search history.

(56) References Cited

U.S. PATENT DOCUMENTS

| | | | |
|---|---|---|---|
| 4,634,807 A | | 1/1987 | Chorley et al. |
| 4,747,139 A | * | 5/1988 | Taaffe .......................... 380/44 |
| 5,182,707 A | * | 1/1993 | Cooper et al. ................ 422/55 |
| 5,375,241 A | | 12/1994 | Walsh |
| 5,530,752 A | | 6/1996 | Rubin |
| 5,604,800 A | * | 2/1997 | Johnson et al. ............. 713/189 |
| 5,675,645 A | * | 10/1997 | Schwartz et al. ........... 713/187 |
| 5,797,015 A | | 8/1998 | Daniels, Jr. et al. |
| 5,802,367 A | | 9/1998 | Held et al. |
| 5,838,911 A | | 11/1998 | Rosenhauer et al. |
| 5,916,308 A | | 6/1999 | Duncan et al. |
| 5,935,246 A | * | 8/1999 | Benson ......................... 726/28 |
| 6,041,363 A | | 3/2000 | Schaffer |

(Continued)

FOREIGN PATENT DOCUMENTS

JP    1-263734    10/1989

(Continued)

OTHER PUBLICATIONS

Bennet Yee; Using Secure Coprocessors; 1994.*

(Continued)

*Primary Examiner*—Nasser Moazzami
*Assistant Examiner*—Mohammad Reza
(74) *Attorney, Agent, or Firm*—Drinker Biddle & Reath LLP (57) ABSTRACT

A system and method in which the operating system of the user computer loads the software application and a DLL having a portion of the application execution code stored therein into memory is disclosed. At selected points during its execution, the software application calls the DLL to execute a portion of the application code that was saved into the DLL before delivery to the end user. Since this code is encrypted and the encryption key is stored in a hardware security device and not in the DLL or the software application, the application code portion cannot be executed without recovering the key.

49 Claims, 7 Drawing Sheets

U.S. PATENT DOCUMENTS

| | | | |
|---|---|---|---|
| 6,052,778 | A | 4/2000 | Hagy et al. |
| 6,141,698 | A | 10/2000 | Krishnan et al. |
| 6,148,325 | A | 11/2000 | Schmidt et al. |
| 6,363,409 | B1 | 3/2002 | Hart et al. |
| 6,378,072 | B1 * | 4/2002 | Collins et al. .............. 713/187 |
| 6,405,316 | B1 | 6/2002 | Krishnan et al. |
| 6,421,703 | B1 | 7/2002 | Steinmetz et al. |
| 6,442,752 | B1 | 8/2002 | Jennings et al. |
| 6,446,204 | B1 * | 9/2002 | Pang et al. ................. 713/153 |
| 6,996,720 | B1 * | 2/2006 | DeMello et al. ............ 713/189 |
| 2002/0053024 | A1 * | 5/2002 | Hashimoto et al. ......... 713/168 |
| 2003/0065929 | A1 * | 4/2003 | Milliken .................... 713/189 |

FOREIGN PATENT DOCUMENTS

| | | |
|---|---|---|
| JP | 8-339296 | 12/1996 |
| WO | WO 00/39956 | 7/2000 |
| WO | WO 00/62159 | 10/2000 |

OTHER PUBLICATIONS

Public Key Technology in Windows 2000; 2001.*

Marko Hanniksinen, Timo Vanhatupan, Timo Hmlinen, Jukka Saarinen; Windows NT Software Design and Implementation for a Wireless LAN Base Station; 1999.*

Noah Mendelsohn; Operating Systems for Component Software Environments; 1997.*

* cited by examiner

SOFTWARE PROTECTION METHOD UTILIZING HIDDEN APPLICATION CODE IN A PROTECTION DYNAMIC LINK LIBRARY OBJECT

CROSS-REFERENCE TO RELATED APPLICATIONS

This application claims benefit of U.S. Provisional Patent Application No. 60/331,855, entitled "SOFTWARE PROTECTION METHOD WITH HIDDEN APPLICATION CODE IN PROTECTION DLL," by Mehdi Sotoodeh, Brian Grove, and Laszlo Elteto, filed Nov. 20, 2001.

BACKGROUND OF THE INVENTION

1. Field of the Invention

The present invention relates to systems and methods for protecting software from unauthorized use or copying, and in particular to a system and method for protecting software using a hidden application code in a dynamic link library object.

2. Description of the Related Art

Software protection systems are in wide use today. Broadly speaking, these software protection systems can be categorized by how they check whether use of the software is authorized. A first such category includes those software protection systems that use software protection routines that are linked in within the software application itself. A second such category includes software protection routines that are disposed in a loadable library (e.g. a dynamic link library, or DLL) external to the software application. A third such category includes a shell, or wrapper around the software application.

Because linked-in code is more difficult to replace/emulate than a function in an external library, and because shell/wrappers offer the additional protection of (a) encryption of the original code, so most disassemblers will not work, and (b) checksumming the code so attempted code modification can be detected, it is generally best to combine the characteristics of the first and third above categories. However, many software applications and programming languages do not allow linking to externally written and compiled code. Typically, the application can call DLLs through a specific application programming interface (API), but this technique is not entirely secure because such DLLs can be easily disabled (e.g. by replacement with a substitute DLL without the required functionality) by a software hacker. Further, the software applications (or the DLLs) typically do not check to assure that the proper DLL (instead of a hacker-substituted DLL) is loaded. Software hackers can also defeat such software protection systems by altering the application itself, for example, by bypassing application code that performs or initiates the authorization or licensing check.

Some protection DLLs check their own code, but they do not check the calling application. Application vendors also generally do not have the experience or the time to write elaborate code to check their own code or that of the associated DLLs. Since the software application calls the DLL, a hacker could potentially remove all application instructions that call any protection DLLs (checking calls), rendering the software protection system ineffective. What is needed is a system which can help software application vendors protect the software programs with minimal modification to the original (unprotected) code and which cannot be defeated by removing protection DLL calls in the application. The present invention, which places some of the protected applications code into the protected DLL, satisfies this need.

SUMMARY OF THE INVENTION

To address the requirements described above, the present invention discloses a method, apparatus, article of manufacture, and a memory structure for protecting software applications from unauthorized use and/or copying.

In summary, the present invention discloses a technique in which the operating system of the user computer loads the software application and a DLL having a portion of the application execution code stored therein into memory. At selected points during its execution, the software application calls the DLL to execute a portion of the application code that was saved into the DLL before delivery to the end user. Since this code is encrypted and the encryption key is stored in a hardware security device and not in the DLL or the software application, the application code portion cannot be executed without recovering the key.

The method comprises the steps of encrypting a compiled portion of the application code according to an encryption key, storing the encrypted code in a DLL associated with the software application, generating a value derived from the compiled portion of the application code, generating a second value derived from the application code and the encryption key, and storing the second computed value in a hardware security device. After the software application is distributed to the end-user and the application is executed, the DLL calculates the value derived from the application code, generates a random number, generates a third value from the value derived from the application code and the random number. The DLL then transmits the third value to a hardware security device, where a fifth value is generated from the third value and the second value and transmitted back to the DLL. The DLL then computes a seventh value from the fifth value and the random number, and decrypts the encrypted portion of the application code using the seventh value. In one embodiment, the DLL re-encrypts the application code with the seventh value before sending the result of the DLL call back to the application code. The apparatus comprises the means for performing the foregoing operations, and substantial equivalents thereof

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Figure 1:
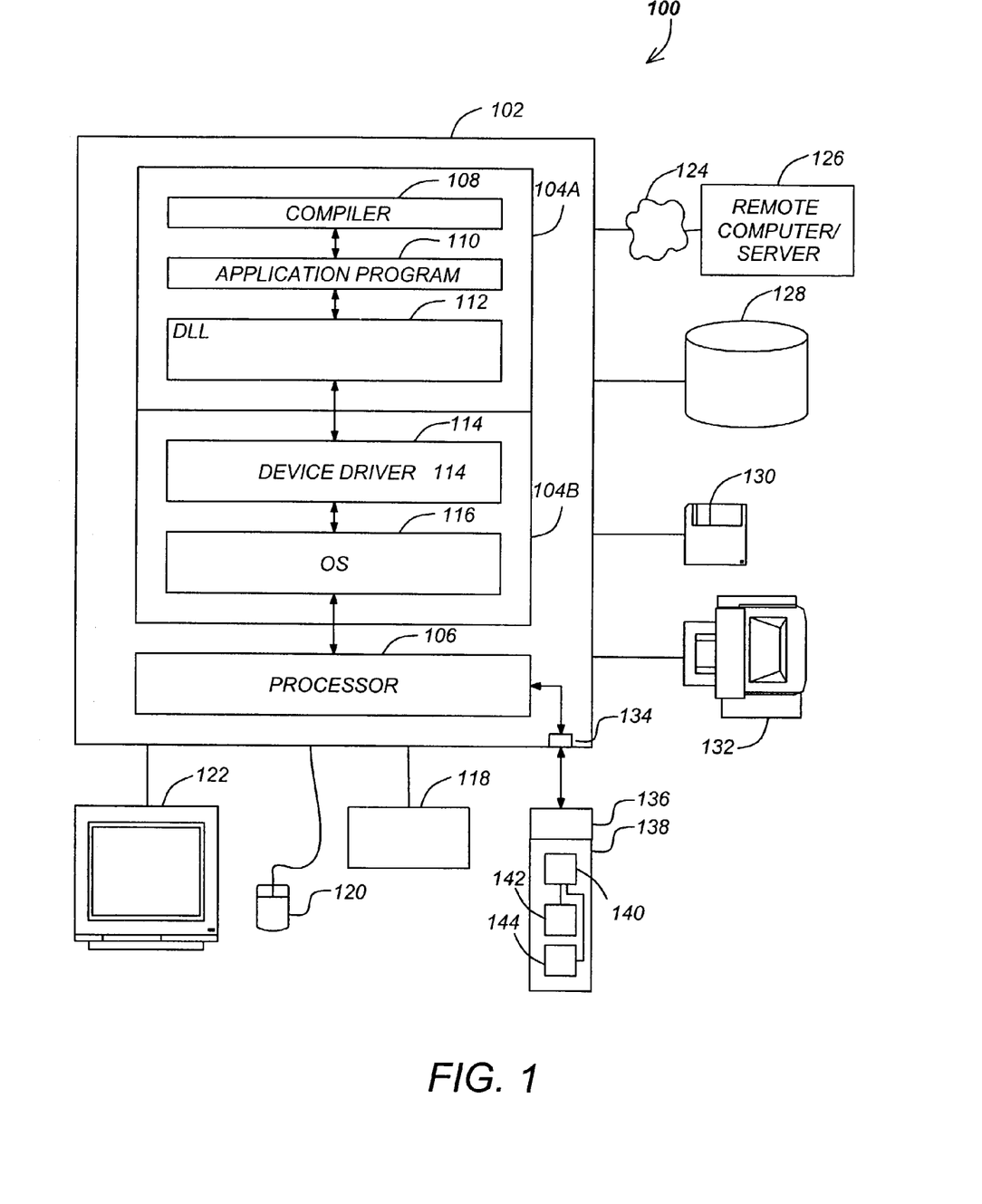
FIG. 1 is a block diagram showing an exemplary hardware environment for practicing the present invention.

FIG. 1 illustrates an exemplary developer computer system 100 that could be used to implement the present invention. The developer computer 102 comprises a processor 106 and a memory 104, such as random access memory (RAM) which may include a user memory 104A and a kernel memory 104B. The developer computer 102 is operatively coupled to a display 122, which presents images such as windows to the user on a graphical user interface. The developer computer 102 may be coupled to other devices, such as a keyboard 118, a mouse device 120, a printer 132, etc. Of course, those skilled in the art will recognize that any combination of the above components, or any number of different components, peripherals, and other devices, may be used with the developer computer 102.

Generally, the developer computer 102 operates under control of an operating system 116 stored in the memory 104, and interfaces with the user to accept inputs and commands and to present results through a graphical user interface (GUI) module. The instructions performing the GUI functions can be resident or distributed in the operating system 116, the application program 110, or implemented with special purpose memory and processors. Embodiments of the developer computer 102 used by software application developers also include a compiler 108 which allows an application program 110 written in a programming language such as COBOL, C++, FORTRAN, or other language to be translated into processor 106 readable code. The compiled application code 110 accesses and manipulates data stored in the memory 104 of the developer computer 102 using the relationships and logic that are generated using the compiler 108.

The developer computer 102 also typically comprises a device driver 114 and a dynamic link library 112. The device driver 114 includes one or more software modules that provide a link between the operating system 114 and peripheral devices (e.g. 122, 120, 118, 138, 132) communicatively coupled to the computer. The dynamic link library 112 includes one or more executable program modules that perform one or more of the functions required by the application program 110. DLLs 112 are not launched directly by the user, but when needed, they are called for by a running application (e.g. 110) and are loaded to provide the required functionality.

The developer computer 102 also comprises an input/output (I/O) port 134 for a hardware security device (HSD) 138. In one embodiment, the I/O port 134 is a USB-compliant port implementing a USB-compliant interface. The HSD 138 includes a processor 140 communicatively coupled to the I/O port 136 and a memory 142 communicatively coupled to the processor 140. The processor 140 performs the operations ascribed to the HSD 138 using processor instructions stored in the memory 142 of the HSD 138. The HSD 138 memory 142 typically includes a secure memory that cannot be read by the end-user, a read only memory (ROM) and a random access memory (RAM). The HSD 138 may also include a hardware module 144 to implement the operations described below. For example, encryption and/or decryption operations can be performed by the hardware module 144.

In one embodiment, instructions implementing the operating system 116, the application program 110, and the compiler 108 are tangibly embodied in a computer-readable medium, e.g., data storage device 130, which could include one or more fixed or removable data storage devices, such as a zip drive, floppy disc drive, hard drive, CD-ROM drive, tape drive, etc. Further, the operating system 116 and the application program 110 are comprised of instructions which, when read and executed by the developer computer 102, causes the developer computer 102 to perform the steps necessary to implement and/or use the present invention. Application program 110 and/or operating instructions may also be tangibly embodied in memory 104 and/or data communications devices, thereby making a computer program product or article of manufacture according to the invention. As such, the terms "article of manufacture" and "computer program product" as used herein are intended to encompass a computer program accessible from any computer readable device or media.

The developer computer 102 may be communicatively coupled to a remote computer or server 126 via communication medium 124 such as a dial-up network, a wide area network (WAN), local area network (LAN), virtual private network (VPN) or the Internet. Program instructions for computer operation, including additional or alternative application programs can be loaded from the remote computer/server 126. In one embodiment, the developer computer 102 implements an Internet browser, allowing the user to access the world wide web (WWW) and other internet resources.

Those skilled in the art will recognize that many modifications may be made to this configuration without departing from the scope of the present invention. For example, those skilled in the art will recognize that any combination of the above components, or any number of different components, peripherals, and other devices, may be used with the present invention.

Figure 2A:
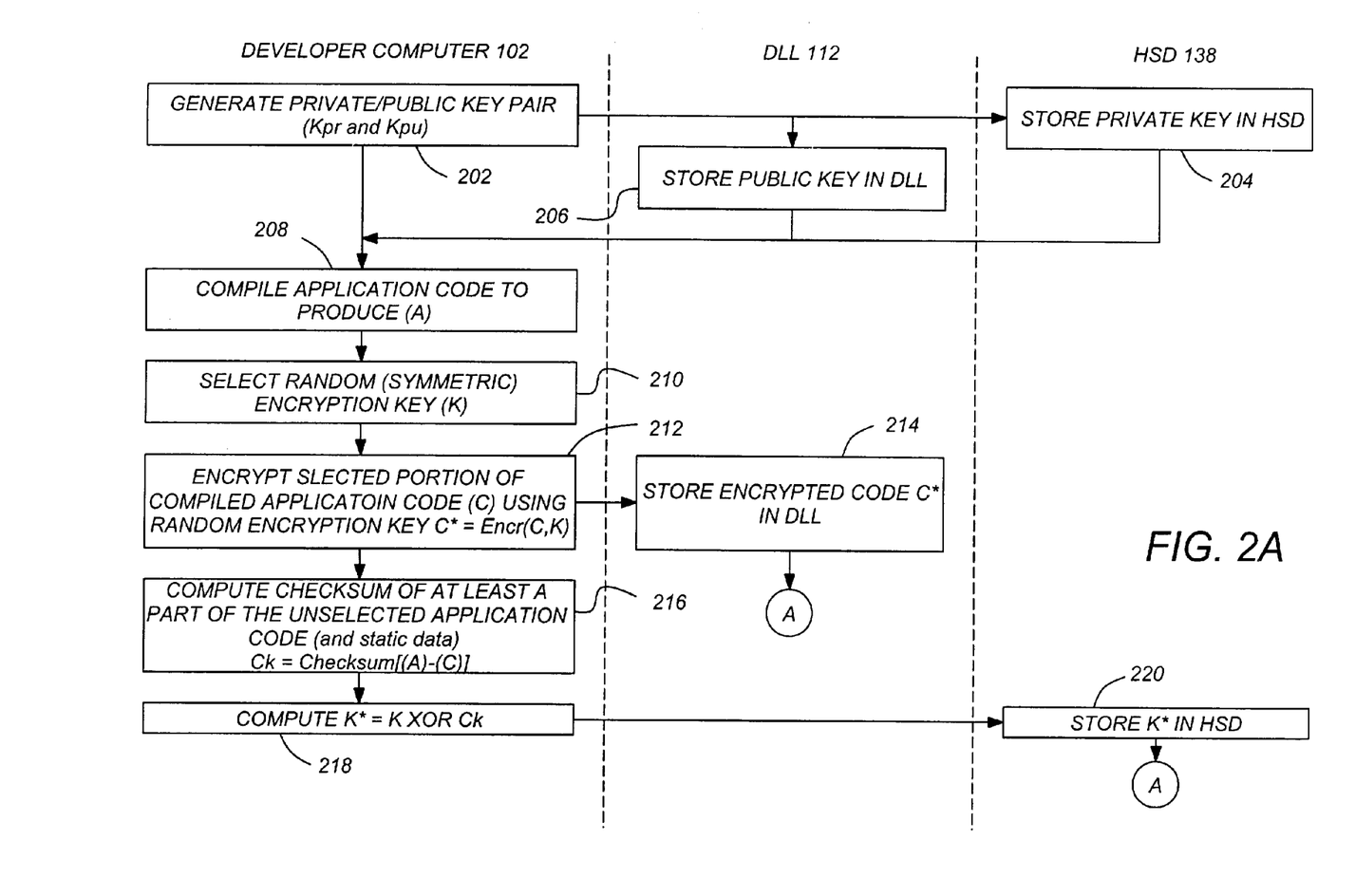
FIG. 2A is a flow chart presenting illustrative process steps that can be used to prepare an unprotected software application program before issuing the application program to the end user.

FIG. 2A is a flow chart presenting illustrative method steps that can be used to prepare an unprotected software application program 110 before issuing the application program 110 to the end user. A private/public key pair, $K_{pr}/K_{pu}$ is generated in the developer computer 102, as shown in step 202. The key pair $K_{pr}/K_{pu}$ is usable in implementing a public key cryptographic algorithm such as Rivest-Shamir-Adleman (RSA).

The private key and the public key $K_{pu}$ are stored, as shown in blocks 204 and 206, respectively. In one embodiment, the private key $K_{pr}$ is stored in the HSD 138 is kept secret and is kept secure from disclosure to the software end user, and the public key $K_{pu}$ is stored in the DLL 112. Alternatively, the public key $K_{pu}$ can be stored in the application program 110 in a way that the DLL 112 can retrieve it, or the application program 110 can pass the public key $K_{pu}$ to the DLL 112 when the application program 110 makes a call to the DLL 112. In the description that follows, the public key is assumed to have been stored in the DLL 112.

The application 110 is compiled to produce a compiled application code (A), as shown in block 208.

Figure 2B:
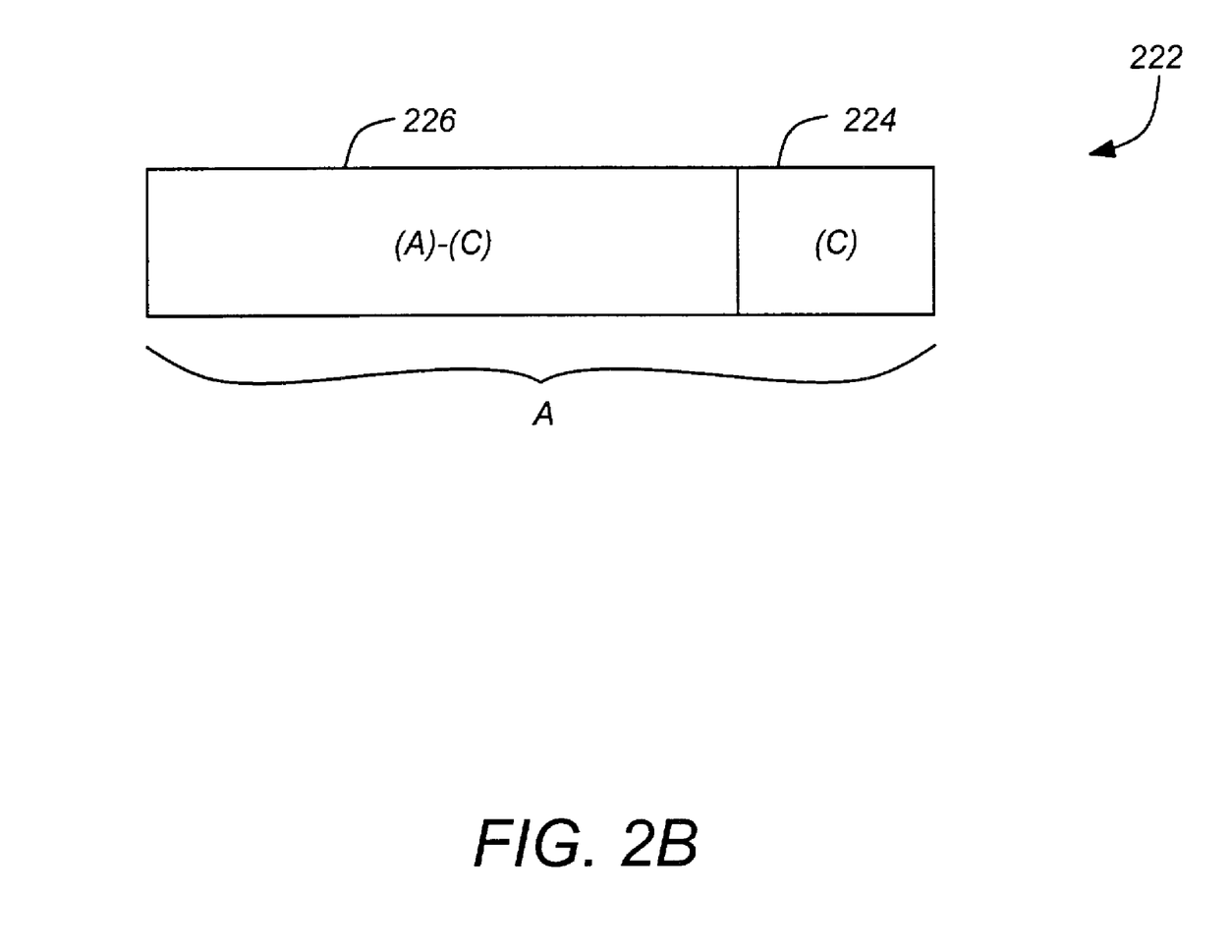
FIG. 2B is a diagram showing how the compiled application code can be segmented into two portions.

FIG. 2B is a diagram illustrating how the compiled application code (A) may be segmented into a first portion (C) and a second portion (A)-(C).

Returning to FIG. 2A, the first portion (C) can be encrypted with a randomly selected secret encryption key, and the result [C*=Encr(C, K)] and stored in the DLL 112. This is illustrated in blocks 210-214.

A value is computed from the second portion (A)-(C) of the compiled application code, as shown in block 216. In one embodiment, the value is the checksum of the application program 110 code. If desired, the checksum can be computed on the application code's static data as well as the application code itself. The checksum can also be computed on the DLLs code (optionally including the DLL's static data) as well as the application code.

Finally, a value K* is computed from the random encryption key (K) and the checksum of the application (Ck), as shown in block 218. In the illustrated embodiment, this is accomplished by computing K* from the exclusive or (XOR) of the encryption key (K) and the checksum (Ck). Then, the computed value K* is stored in the HSD 138 as shown in block 220.

Figure 3:
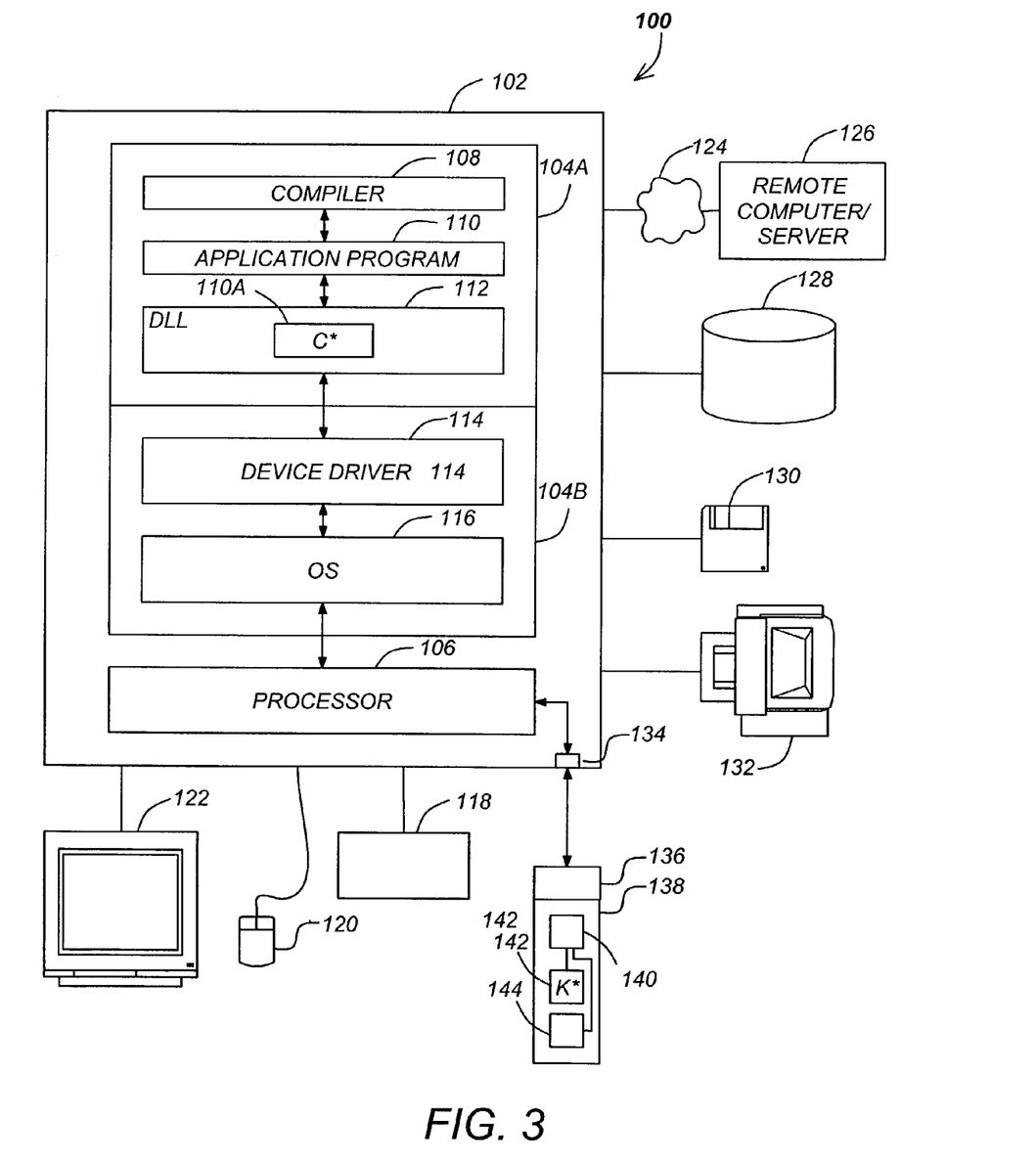
FIG. 3 is a diagram depicting the elements of FIG. 1, showing the values C* and K* stored in the DLL and the HSD.

FIG. 3 is a diagram depicting the elements of FIG. 1, showing the values C* and K* stored in the DLL 112 and the HSD 138, respectively.

At this point, the application software 110, the DLL 112 (which includes the encrypted code C*), and the prepared HSD (having the value K* stored in a memory therein) is provided to the end user.

Figure 4:
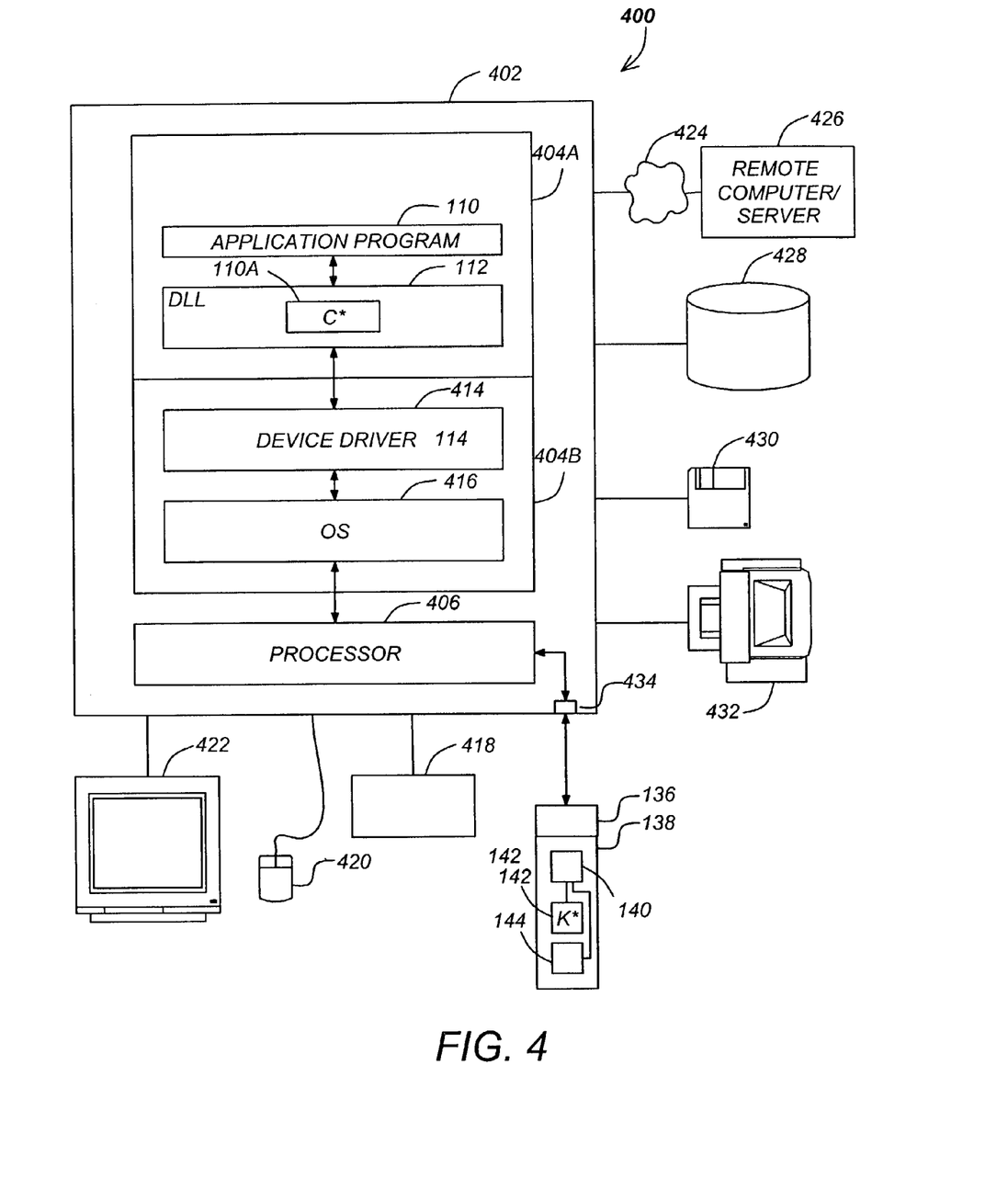
FIG. 4 is a diagram depicting an end-user computer system.

FIG. 4 is a diagram depicting an end-user computer system 400 and associated elements. The end-user computer system 400 includes elements analogous to those of the developer computer system 100. The end-user computer 402 comprises a processor 406 and a memory 404, such as random access memory (RAM) which may include a user memory 404A and a kernel memory 404B. The end-user computer 402 is operatively coupled to a display 422, which presents images such as windows to the user on a graphical user interface. The end-user computer 402 may be coupled to other devices, such as a keyboard 418, a mouse device 420, a printer 432, etc. Of course, those skilled in the art will recognize that any combination of the above components, or any number of different components, peripherals, and other devices, may be used with the end-user computer 402.

Generally, the end-user computer 402 operates under control of an operating system 416 stored in the memory 404, and interfaces with the user to accept inputs and commands and to present results through a graphical user interface (GUI) module. The instructions performing the GUI functions can be resident or distributed in the operating system 416, the application program 110, or implemented with special purpose memory and processors. The compiled application code 110 accesses and manipulates data stored in the memory 404 of the end-user computer 402. The end-user computer 402 also comprises an input/output (I/O) port 434 for the hardware security device (HSD) 138.

The end-user computer 402 also typically comprises a device driver 414 and a dynamic link library the dynamic link libraries associated with and called by the application program 110 when required.

In one embodiment, instructions implementing the operating system 416, the application program 110 and the DLL 112 are tangibly embodied in a computer-readable medium, e.g., data storage device 430, which could include one or more fixed or removable data storage devices, such as a zip drive, floppy disc drive, hard drive, CD-ROM drive, tape drive, etc. Further, the operating system 416 and the application program 110 are comprised of instructions which, when read and executed by the end-user computer 402, causes the end-user computer 402 to perform the steps necessary to implement and/or use the present invention. Application program 110, DLL 112 and/or operating instructions may also be tangibly embodied in memory 404 and/or data communications devices, thereby making a computer program product or article of manufacture according to the invention.

As was true with the developer computer, the end-user computer 402 may be communicatively coupled to a remote computer or server 426 via communication medium 424 such as a dial-up network, a wide area network (WAN), local area network (LAN), virtual private network (VPN) or the Internet. Program instructions for computer operation, including additional or alternative application programs can be loaded from the remote computer/server 426 (which may be the developer computer 102). In one embodiment, the end-user computer 402 implements an Internet browser, allowing the user to access the world wide web (WWW) and other internet resources.

Figure 5A:
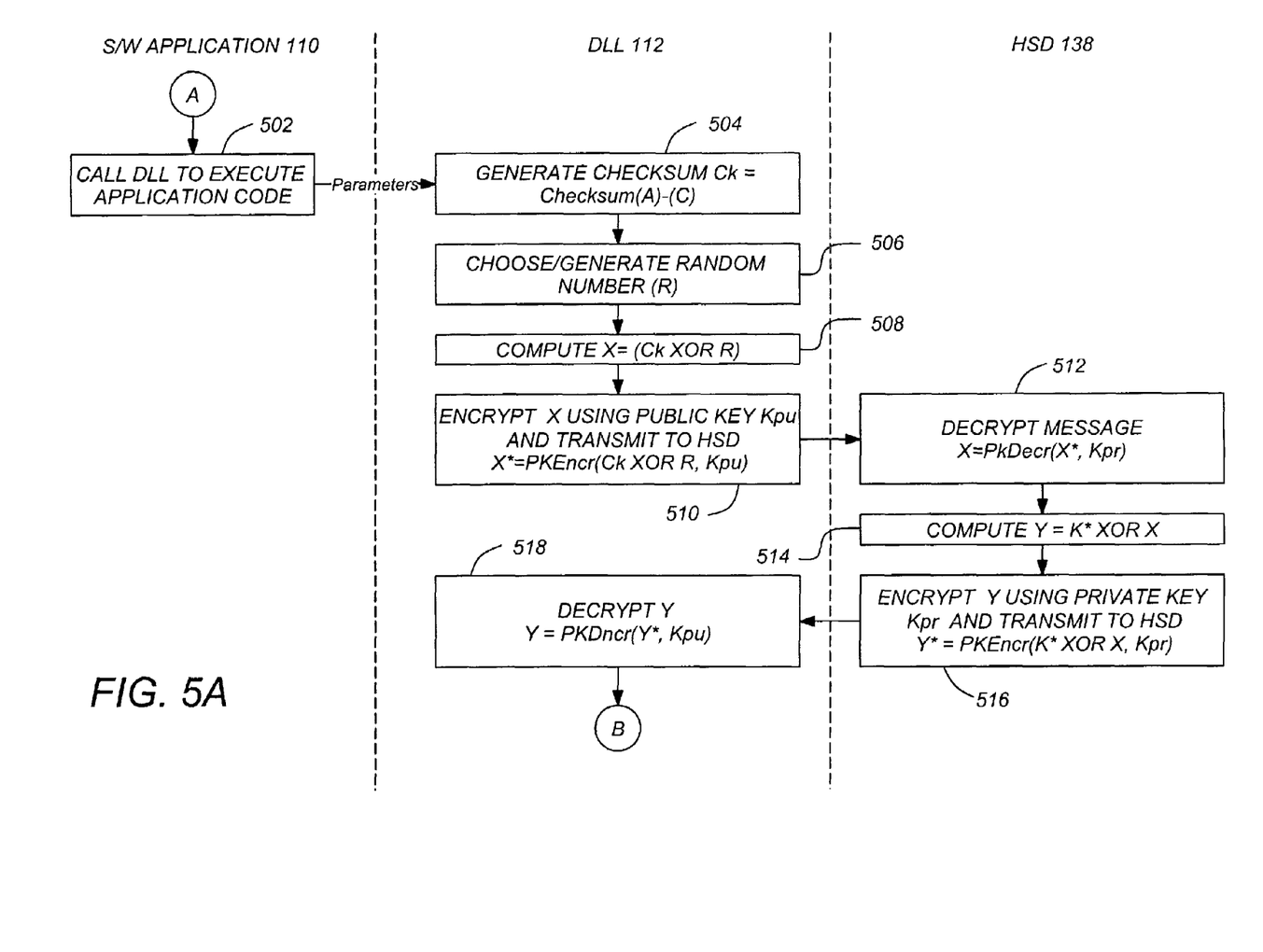
FIGS. 5A and 5B are flow charts presenting illustrative process steps that can be used to execute a software application that has been protected as shown in FIG. 2.
Figure 5B:
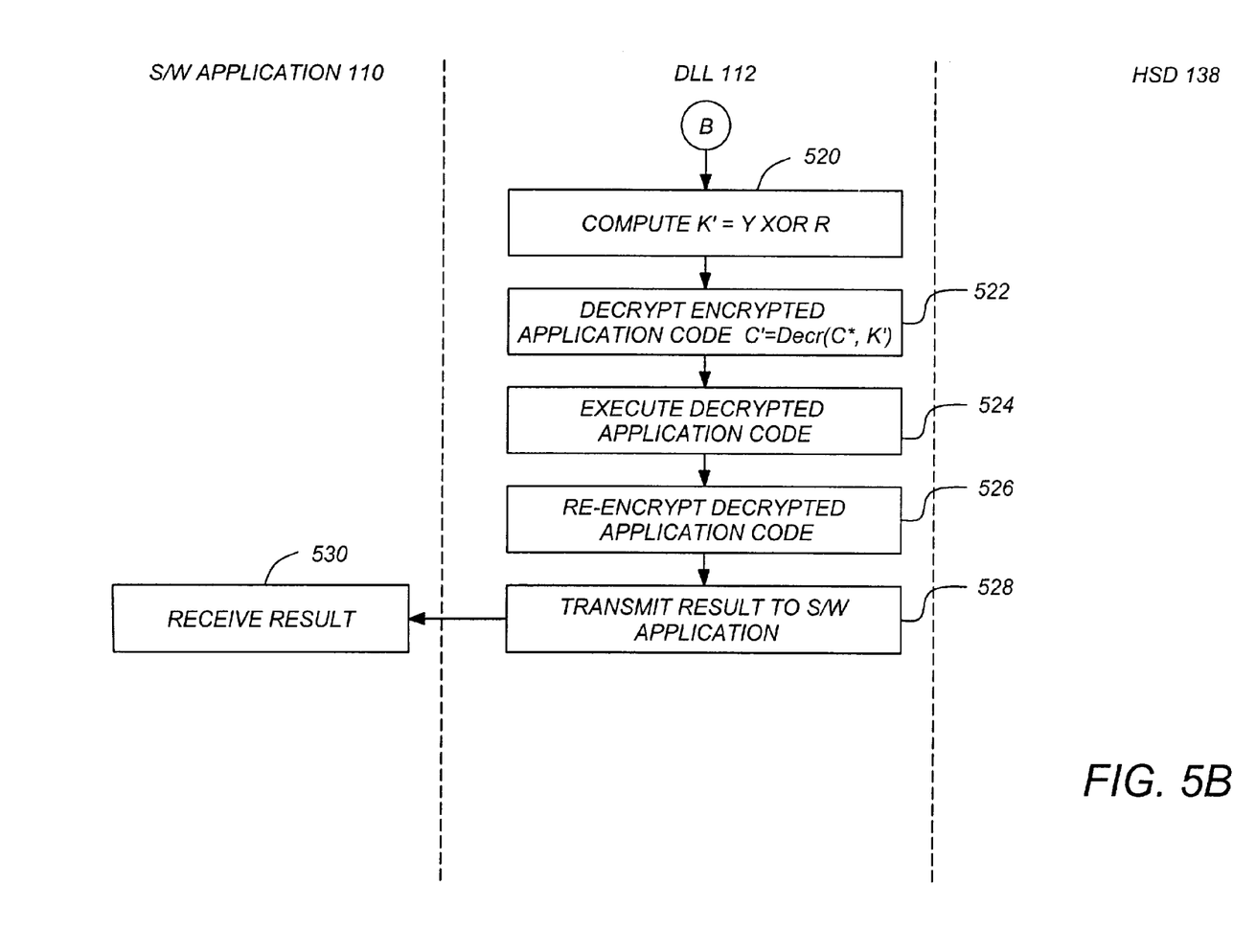

FIGS. 5A and 5B are flow charts presenting illustrative process steps that can be used to execute a software application 110 that has been protected by the method shown in FIG. 2. The end-user loads the software application program 110 and the DLL 112 into the memory 404 of the end-user computer 402, and attaches the HSD 138 to the I/O port 434. Then, using appropriate input commands, the end-user executes the application program When the end user runs the application on the end-user computer 402, at selected points in the execution process, the application must perform some calculation or other operation using the code (C*) 110A that is stored in the DLL 112. The application 110 calls the DLL 112, passing the parameters required for the necessary calculation or operation. This is shown in block 502. Optionally, the public key $K_{pu}$, generated at protection time (illustrated in FIG. 2) is also passed to the DLL 112.

As shown in block 504, the DLL 112 generates a value (analogous to the value computed in block 216) from the application code. In one embodiment, the value is a checksum of the application's code (Ck) (and, optionally, static data). Although it can be generally assumed that a well-written DLL can verify the integrity of its own code (and data), the present invention can be implemented by checksum the DLL as well as the application. In this case, the block 216 of FIG. 2 and of block 504 of FIG. 5A includes the a checksum of the application and the DLL as follows: Ck=Checksum(App)+Checksum(DLL). If desired, Checksum(DLL) can include includes the DLL's own code and related static data. Further, the value of Ck can be computed by the application of other operations (other than the "+" operation) to the Checksum(A) and Checksum (DLL) values. Such operations may include, for example, an exclusive or (XOR) or a hash operation (e.g. Hash(Checksum(A) |Checksum(DLL)). The checksumming operation can be performed by any method selected by the DLL 112 provider, including simply adding or XORing code (bytes, words or dwords), HASHing code, MACing code, or similar methods.

To make communications with the HSD 138 unique, the DLL 112 selects a random number (R) as a "salt", as shown in block 506. The random number R is chosen from a sufficiently large range of possibilities so to prevent a hacker from attacking the software protection system.

Next, as shown in block 508, a value (X) is computed from the random number (R) and the checksum (Ck), as shown in block 508. In one embodiment, the value (X) is computed as the checksum (Ck) XORed with the random number (R).

Then, as shown in block 510, the value (X) is encrypted using the public key $K_{pu}$ to produce a value (X*) and transmitted to the HSD 138 as a challenge (typically via a device driver 414). The HSD 138 receives a message having the (X*) value, and, using the private key $K_{pr}$ decrypts (X*) value to obtain the (X) value, as shown in block 512. The HSD 138 then computes a value (Y) from the (K*) value stored in block 220 and the (X) value. In the illustrated embodiment, the value (Y) is computed as the (K*) value XORed with the (X) value, as shown in block 514. The (Y) value is then encrypted using the private key $K_{pr}$ to produce a (Y*) value. The (Y*) value is then sent to the DLL 112, as shown in block 516.

The DLL 112 decrypts Y* using the public key $K_{pu}$ to produce (Y), as shown in block 518. A value (K') is computed from the (Y) value and the random number (R), as shown in block 520. In the illustrated embodiment, the (K') value is computed as the (Y) value XORed with the random number (R). Note that nominally, K'=(K* XOR(Ck XOR R))XOR R=((K XOR Ck)XOR(Ck XOR R)XOR R=K.

The (formerly encrypted) application code (C*) is decrypted using the K' value to produce the decrypted application code (C'), as shown in block 522. The decrypted application code (C') is executed (called with the application-supplied parameters), as shown in block 524. The result is saved, and ultimately transmitted to the software application 110, as shown in block 528. In one embodiment of the invention, the decrypted application code (C') is re-encrypted to restore the original, protected state before the result is transmitted to the software application, as shown in block 526.

Intermediate Computations

For purposes of example, the XOR operation is cited in the foregoing discussion for purpose of computing intermediate values and other results. However, any function invertible function (including symmetric encryption/decryption) can be used to practice the present invention. An invertible function $f$ can be defined such that if $f(a,b)$ is the function and $f^{-1}(c,b)$ is its inverse, if $C=f(A,B)$ then $A=f^{-1}(C,B)$. The XOR operation is invertible because if C=A XOR B, then A=C XOR B.

The operations described in FIGS. 2, 5A, and 5B can be generalized using invertible functions $f$ and $g$ and a one-way hash function, h as follows:

With regard to the operations used in protecting the software application 110 (described in FIG. 2), the operation K*=(K XOR Ck) of block 218 can be described as K*=$f$(K, Ck).

Referring to the runtime operations described in FIG. 5A:

the operations X=(Ck XOR R) and X*=PKEncr(Ck XOR R, $K_{pu}$) described in blocks 508 and 510 can be described instead as X=h(Ck,R), and the DLL 112 saves the Ck and X values for later use;

the operations Y=K* XOR X and Y*=PKEncr(K* XOR X, $K_{pr}$) described in blocks 514 and 516 can be described instead as Y=g(K*,X); and the operation Y=PKDecr(Y*,$K_{pu}$) described in block 518 can be described instead as K*=$g^{-1}$(Y,X).

Further, referring to the runtime operations described in FIG. 5B, the operation K'=Y XOR R described in block 520 can be described instead as K'=$f^{-1}$(K*,Ck).

Hence, if Ck was the same value as the checksum computed at protection time, then K'=K. Thus, the encryption key, K, is recovered, and can be used to decrypt the application code in the DLL 110A

CONCLUSION

This concludes the description of the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching.

For example, the functions and operations described above can be implemented in a variety of ways. For example, the encryption and/or decryption functions performed by the HSD 138 can be performed by one or more software modules (each with processor instructions supporting the encryption/decryption of values and/or messages), by one or more hardware modules (each with electronic circuit components) or by a combination of hardware and software modules.

It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of protecting a software application from unauthorized use, the method comprising:
   preparing the software application using a computer having a processor and a hardware security device including a secure coprocessor; and
   executing the prepared software on an end-user computer having a processor;
   wherein the preparing software application comprises:
   (a) encrypting a first portion (C) of a compiled application code (A) according to an encryption key (K) using the computer processor to produce an encrypted code (C*);
   (b) storing the encrypted code (C*) in a dynamic link library (DLL) executed by the computer processor and associated with the software application;
   (c) generating a value (Ck) derived from at least a part of the compiled application code (A);
   (d) generating a second value (K*) derived from the value (Ck) and the encryption key (K);
   (e) storing the second value (K*) in the hardware security device; and executing the prepared software on the end-user computer comprises:
   (f) generating the value (Ck) derived from the at least a part of the compiled application code (A) with the processor of the end-user computer;
   (k) generating a fifth value (Y) with the secure coprocessor based on the second value (K*);
   (l) transmitting the fifth value (Y) from the hardware security device to the DLL;
   (m) computing a seventh value (K') with the processor of the end user computer from the fifth value (Y);
   (n) decrypting the encrypted code (C*) with the processor of the end user computer using the seventh value (K'); and
   (o) executing the decrypted code (C) with the processor of the end user computer.

2. The method of claim 1, wherein the value (Ck) is derived from at least a part of a second portion (A)-(C) of the compiled application code (A).

3. The method of claim 1, further comprising the steps of compiling an uncompiled application code to produce the compiled application code (A); and selecting the first portion (C) of the compiled application code (A) for encryption and storage in the DLL.

4. The method of claim 1, further comprising the step of generating an encryption key K.

5. The method of claim 1, wherein the encryption key K is randomly generated.

6. The method of claim 1, wherein the encryption key K is a symmetric key.

7. The method of claim 1, wherein the value (Ck) is a checksum derived from at least a part of the compiled application code (A).

8. The method of claim 1, wherein the second value (K*) is derived according to K*=K XOR (Ck).

9. The method of claim 1, wherein: the value (Ck) generated in step (c) is derived from at least a part of a second portion (A)-(C) of the compiled application code (A); and the value (Ck) generated in step (f) is derived from at least a part of the second portion (A)-(C) of the compiled application code (A).

10. The method of claim 1, wherein: the value (Ck) generated in step (c) is a checksum derived from at least a part of a second portion (A)-(C) of the compiled application code (A); and the value (Ck) generated in step (f) is a checksum derived from at least a part of the second portion (A)-(C) of the compiled application code (A).

11. The method of claim 1, wherein, executing the protected software further comprises, after step (f) and before step (k):
(g) generating a random number (R);
(h) generating a third value (X) from the value (Ck) and the random number (R); and
(j) transmitting the third value (X) to the hardware security device;
wherein, step (k) further comprises using the third value (X) and the second value (K*) to generate a fifth value (Y) with the secure coprocessor; and
wherein, step (m) further comprises the fifth value (Y) and the random number (R) to compute a seventh value (K') with the processor of the end-user computer.

12. The method of claim 11, wherein steps (f) and (h) are performed by the DLL.

13. The method of claim 11, wherein steps (f)-(h) are performed by the DLL.

14. The method of claim 11, wherein the third value X=Ck XOR R.

15. The method of claim 11, further comprising the step of calling the DLL from the software application to execute the first portion of the application code (C) using the end-user computer processor.

16. The method of claim 11, wherein:
the method further comprises the steps of: generating a key pair having a public key $K_{pu}$ and private key $K_{pr}$; storing the private key $K_{pr}$ in a memory of a hardware security device; and storing the public key $K_{pu}$;
the step of transmitting the third value to the hardware security device comprises the steps of: encrypting the third value with the public key $K_{pu}$ to produce a fourth value (X*); and decrypting the fourth value (X*) using the private key $K_{pr}$ to produce the third value (X); and
the step of transmitting the fifth value to the DLL comprises the steps of: encrypting the fifth value (Y) according to the private key $K_{pr}$ to produce a sixth value (Y*); and decrypting the sixth value (Y*) with the public key $K_{pu}$ to produce the fifth value (Y).

17. The method of claim 16, wherein the public key $K_{pu}$ is stored in the DLL.

18. The method of claim 16, wherein the public key $K_{pu}$ is stored in the software application.

19. The method of claim 16, wherein the step of encrypting the third value (X) with the public key $K_{pu}$ to produce a fourth value (X*) is performed by the DLL using the computer processor.

20. The method of claim 16, wherein the step of decrypting the fourth value (X*) using the private key $K_{pr}$ to produce the third value (X) is performed by the hardware security device.

21. The method of claim 11, further comprising the step of re-encrypting the decrypted code (C) according to the encryption key (K).

22. The method of claim 21, further comprising the step of: saving the result after executing the decrypted code (C) and before re-encrypting the decrypted code (C) according to the encryption key (K).

23. An apparatus of protecting a software application from unauthorized use, comprising a software preparation means and a software execution means, wherein:
the software preparation means comprises:
(a) means for encrypting a first portion (C) of a compiled application code (A) according to an encryption key (K) on a computer having a processor to produce an encrypted code (C*);
(b) means for storing the encrypted code (C*) in a dynamic link library (DLL) executed by the computer processor and associated with the software application;
(c) means for generating a value (Ck) derived from at least a part of the compiled application code (A);
(d) means for generating a second value (K*) derived from the value (Ck) and the encryption key (K);
(e) means for storing the second value (K*) in a hardware security device having a secure coprocessor; and
the software execution means comprises:
(f) means for generating the value (Ck) derived from the at least a part of the compiled application code (A) on an end-user computer having a processor;
(k) means for generating a fifth value (Y) with the secure coprocessor based on the second value (K*);
(l) means for transmitting the fifth value (Y) from the hardware security device to the DLL;
(m) means for computing a seventh value (K') with the processor of the end-user computer from the fifth value (Y); and
(n) means for decrypting the encrypted code (C*) with the processor of the end-user computer using the seventh value (K'); and
(o) means for executing the decrypted code (C) with the processor of the end-user computer.

24. The apparatus of claim 23, wherein the value (Ck) is derived from at least a part of a second portion (A)-(C) of the compiled application code (A).

25. The apparatus of claim 23, further comprising: means for compiling an uncompiled application code to produce the compiled application code (A); and means for selecting the first portion (C) of the compiled application code (A) for encryption and storage in the DLL.

26. The apparatus of claim 23, further comprising means for generating an encryption key K.

27. The apparatus of claim 23, wherein the encryption key K is randomly generated.

28. The apparatus of claim 23, wherein the encryption key K is a symmetric key.

29. The apparatus of claim 23, wherein the value (Ck) is a checksum derived from at least a part of the compiled application code (A).

30. The apparatus of claim 23, wherein the second value (K*) is derived according to K*=K XOR (Ck).

31. The apparatus of claim 23, wherein: the value (Ck) is derived from at least a part of the second portion (A)-(C) of the compiled application code (A).

32. An apparatus of claim 23, wherein the software execution means further comprises:
(g) means for generating a random number (R);
(h) means for generating a third value (X) from the value (Ck) and the random number (R); and
(j) means for transmitting the third value (X) to the hardware security device;
wherein, (k) further comprises using the third value (X) and the second value (K*) to generate the fifth value (Y); and
wherein, (m) further comprises using the fifth value (Y) and the random number (R) to compute the seventh value (K').

33. The apparatus of claim 32, wherein the means for generating the value (Ck) derived from the at least a part of the compiled application code (A) and the means for generating a random number (R) comprises the DLL and the processor of the end-user computer.

34. The apparatus of claim 32, wherein the means for generating the value (Ck) derived from the at least a part of the compiled application code (A), for generating a random number (R), and for generating a third value (X) from the value (Ck) and the random number (R) comprises the DLL and the processor of the end-user computer.

35. The apparatus of claim 23, wherein: the value (Ck) is a checksum derived from at least a part of the second portion (A)-(C) of the compiled application code (A).

36. The apparatus of claim 32, wherein the third value X=Ck XOR R.

37. The apparatus of claim 32, wherein: the means for generating a fifth value (Y) from the third value (X) and the second value (K*) comprises the hardware security device; and the means for computing a seventh value (K') from the fifth value (Y) and the random number (R) comprises the DLL and the processor of the end-user computer.

38. The apparatus of claim 32, wherein: the means for generating a fifth value (Y) from the third value (X) and the second value (K*) comprises the hardware security device; and the means for computing a seventh value (K') from the fifth value (Y) and the random number (R), and the means for decrypting the encrypted code (C*) using the seventh value (K') comprises the DLL and the processor of the end-user computer.

39. The apparatus of claim 23, further comprising means for calling the DLL from the software application to execute the first portion of the application code (C) using the processor of the end-user computer.

40. The apparatus of claim 32, wherein:
the apparatus further comprises: means for generating a key pair having a public key $K_{pu}$ and private key $K_{pr}$; means for storing a private key $K_{pr}$ in a memory of a hardware security device; and means for storing the public key $K_{pu}$;
the means for transmitting the third value to the hardware security device comprises: means for encrypting the third value with the public key $K_{pu}$ to produce a fourth value (X*); and means for decrypting the fourth value (X*) using the private key $K_{pr}$ to produce the third value (X); and
the means for transmitting the fifth value to the DLL comprises: means for encrypting the fifth value (Y) according to the private key $K_{pr}$ to produce a sixth value (Y*); and means for decrypting the sixth value (Y*) with the public key $K_{pu}$ to produce the fifth value (Y).

41. The apparatus of claim 40, wherein the public key $K_{pu}$ is stored in the DLL.

42. The apparatus of claim 40, wherein the public key $K_{pu}$ is stored in the software application.

43. The apparatus of claim 32, further comprising means for re-encrypting the decrypted code (C) according to the encryption key (K).

44. The apparatus of claim 43, wherein the means for re-encrypting the decrypted code (C) according to the encryption key (K) comprises the DLL and the computer processor.

45. The apparatus of claim 43, further comprising: means for saving the result after executing the decrypted code (C) and before re-encrypting the decrypted code (C) according to the encryption key (K).

46. An apparatus for protecting a software application from unauthorized use, comprising: a first software module executing in a developer computer, the first software module for encrypting a first portion (C) of a compiled application code (A) according to an encryption key (K) to produce an encrypted code (C*); storing the encrypted code (C*) in a dynamic link library (DLL) associated with the software application; generating a value (Ck) derived from at least a part of the compiled application code (A); generating a second value (K*) derived from the value (Ck) and the encryption key (K); means for storing the second value (K*) in a hardware security device;
the DLL executing in an end-user computer, the DLL for generating the value (Ck) derived from the at least a part of the compiled application code (A); generating a random number (R); generating a third value (X) from the value (Ck) and the random number (R); transmitting the third value (X) to a hardware security device, the hardware security device including a secure co-processor for generating a fifth value (Y) from the third value (X) and the second value (K*); transmitting the fifth value (Y) to the DLL; wherein the DLL further computes a seventh value (K') from the fifth value (Y) and the random number (R) and decrypts the encrypted code (C*) using the seventh value (K').

47. The apparatus of claim 46, wherein the value (Ck) is derived from at least a part of a second portion (A)-(C) of the compiled application code (A).

48. The apparatus of claim 46, wherein the value (Ck) is a checksum derived from at least a part of the compiled application code (A).

49. The apparatus of claim 46, wherein the second value (K*) is derived according to K*=K XOR (Ck).

* * * * *